Jan. 6, 1970 J. D. WALLACE 3,488,085
CHANNEL ASSEMBLIES FOR CAMPING TRAILERS
Filed Feb. 7, 1968 3 Sheets-Sheet 1

Inventor
Joseph D. Wallace
By:
Dawson, Tilton, Fallon & Lungmus
Attys.

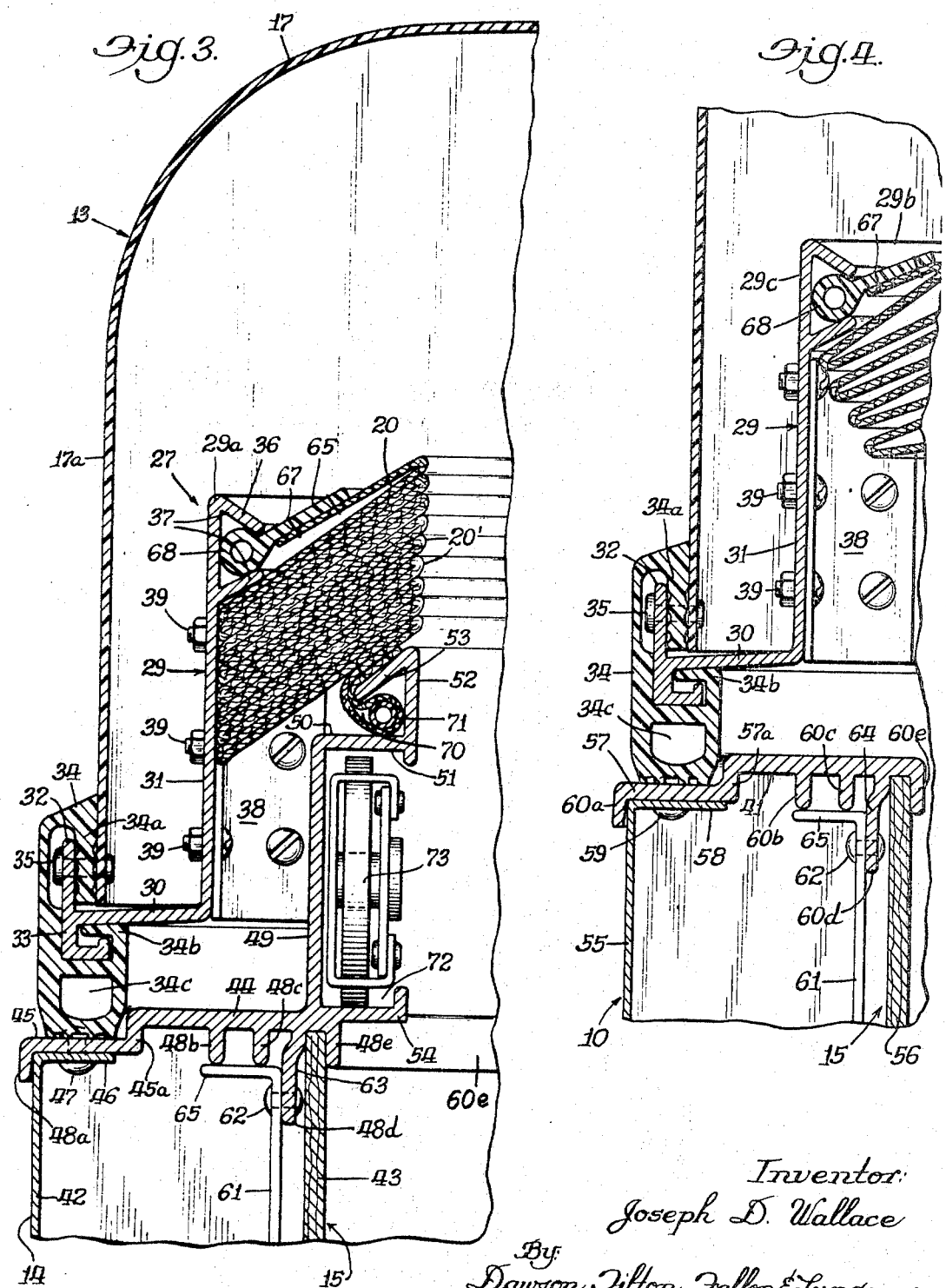

Jan. 6, 1970   J. D. WALLACE   3,488,085
CHANNEL ASSEMBLIES FOR CAMPING TRAILERS
Filed Feb. 7, 1968   3 Sheets-Sheet 3

Inventor:
Joseph D. Wallace
By:
Dawson, Tilton, Fallon & Lungmus
Attys.

United States Patent Office 3,488,085
Patented Jan. 6, 1970

3,488,085
CHANNEL ASSEMBLIES FOR CAMPING TRAILERS
Joseph D. Wallace, Wichita, Kans., assignor to The Coleman Company, Inc., Wichita, Kans., a corporation of Kansas
Filed Feb. 7, 1968, Ser. No. 703,709
Int. Cl. B60p 3/34
U.S. Cl. 296—27    10 Claims

ABSTRACT OF THE DISCLOSURE

Upper and lower channel assemblies for camping trailers. The upper channel assembly is secured to the top of the trailer and the lower assembly is secured to the fixed frame of the trailer. The channel assemblies cooperate to releasably hold the canvas sides of the trailer when the trailer is in the use position and cooperate to form a seal between the top and the fixed frame when the trailer is in the storage position. The upper channel assembly extends perimetrically about the trailer top and includes a base portion attached to the top and extending generally horizontally inwardly from the top. A leg portion extends generally vertically upwardly from the base portion and terminates in a trough opening toward the inside of the top. The lower channel assembly includes a pair of side channels and a pair of end channels. The side and end channels include generally horizontal base portions which extend between the outer and inner panels of the trailer frame walls, and each base portion includes a stepped portion adjacent the outer panel spaced below the remainder of the base portion. The side channels include a leg portion extending generally vertically upwardly from the base portion and terminating in a trough opening toward the outside of the frame. The upper and lower edges of the canvas sides of the trailer are releasably received by the upper and lower troughs, respectively, when the trailer is in the use position, and a gasket carried by the upper channel assembly sealingly engages the stepped portions when the trailer is in the storage position.

BACKGROUND OF THE INVENTION

This invention relates to camping trailers, and, more particularly, to channel assemblies for use in camping trailers.

Camping trailers are generally designed to provide comfortable sleeping, eating, and living quarters for the camper, hunter, and the like while being capable of being folded or disassembled into a relatively compact size so that they may readily be towed by cars or small trucks. These trailers generally include a box-like fixed frame which is carried by a pair of wheels. The fixed frame provides a relatively shallow enclosure which is covered by the trailer top when the trailer is in the storage position, e.g., when the trailer is not being used or is being towed. When the camping trailer is to be set up at the campsite, the top is removed from the fixed frame, and a tent-like canopy or superstructure of canvas or other suitable material is attached to the frame. The canopy extends upwardly from the frame sides for a substantial distance to provide sufficient head room for the camper to move comfortably about within the trailer enclosure, and the canopy may include porch sections which extend outwardly beyond the sides of the frame to provide additional living space. When the trailer is to be towed, the canopy is folded and placed within the enclosure of the frame and covered by the trailer top.

It will be appreciated that it is desirable for the camper to be able to remove the canopy from within the frame enclosure and properly position the canopy above the frame as quickly as possible to provide more time for recreation and relaxation. The trailer should also be adapted for fast and easy repositioning from the use position to the storage position.

Problems have arisen in maintaining an effective seal between the canopy and the trailer frame and top to keep insects and rain from the trailer interior when the trailer is being used, and in maintaining an effective seal between the trailer top and the frame when the trailer is in the storage position. Camping trailers are frequently stored outdoors from one camping season to the next, and if a proper seal is not maintained between the top and the frame, the canopy and other articles stored within the frame enclosure may be subject to deterioration.

SUMMARY OF THE INVENTION

The inventive channel assemblies cooperate to hold the canopy securely yet releasably and to provide an effective seal between the canopy and the trailer top and frame when the trailer is in the use position. The canopy may be quickly and easily attached to and disattached from the channel assemblies. The channel assemblies also cooperate to provide an effective seal between the trailer top and the frame when the trailer is in the storage position, and the assemblies aid in providing a trailer construction which is light in weight yet sturdy.

DESCRIPTION OF THE DRAWING

FIG. 3 is an enlarged fragmentary sectional view taken along the line 3—3 of FIG. 1;
FIG. 4 is an enlarged fragmentary sectional view taken along the line 4—4 of FIG. 1.

DESCRIPTION OF SPECIFIC EMBODIMENT

Figure 1:
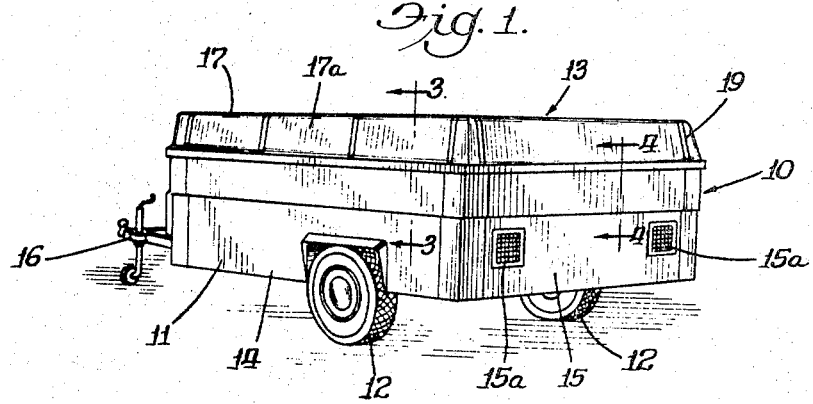
FIG. 1 is a perspective view of a camping trailer in the storage position.
Figure 2:
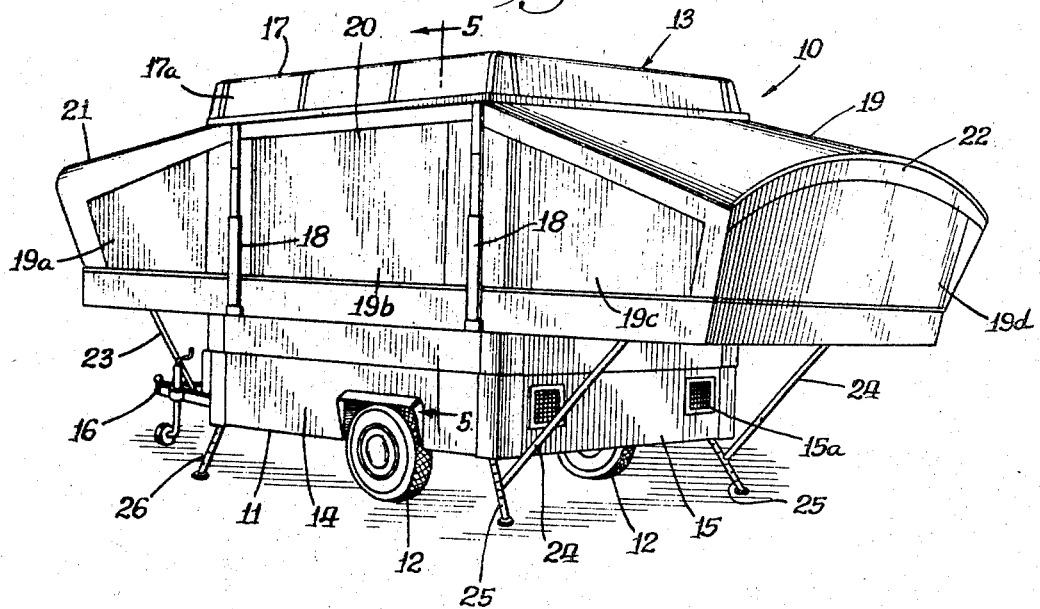
FIG. 2 is a perspective view of the camping trailer in the use position.

Referring to FIGS. 1 and 2, the numeral 10 designates generally a camping trailer which includes a fixed frame 11 mounted on a pair of wheels 12 and a top assembly 13. These camping trailers are well known in the industry, and it is believed sufficient to give only a general description thereof.

The trailer frame 11 is generally box-like in shape and includes a generally vertically extending side wall 14 and a generally vertically extending back wall 15. The generally rectangular horizontal cross section of the frame 11 is completed by another side wall (not shown) which extends generally parallel with the side wall 14 and a front wall (not shown) which extends generally parallel with back wall 15 between the two side walls. The frame also includes a floor or bottom which extends between the frame walls. Rear safety lights 15a may be provided on the rear wall 15 of the frame, and a suitable trailer hitch 16 extends from the front of the trailer frame and is adapted to be connected to an automobile or other towing vehicle.

When the trailer is in the storage position shown in FIG. 1, the enclosure provided by the walls and floor of the frame 11 is covered by the top assembly 13 which includes a relatively flat, generally rectangular cover 17 of approximately the same shape as the perimeter defined by the frame walls. The cover 17 includes a depending perimetric side wall 17a and may advantageously be made of a lightweight but sturdy plastic.

When the trailer is to be used, the top assembly 13 is lifted from the frame 11 and supported generally vertically above the frame by telescoping corner posts 18. The particular support posts 18 form no part of this invention, and it is sufficient that the top assembly 13 be supported in a stable manner above the frame. The top assembly 13 is positioned far enough above the trailer frame to allow a man of average height to walk on the floor of the trailer frame without having to stoop.

A tent-like canvas canopy 19 extends between the top assembly 13 and the frame 11 and provides an enclosure within which the camper may eat, sleep, and relax while being sheltered from rain, insects, and the like. As used herein the word "canvas" is not meant to be limited to any particular material, but may include any suitable cloth-like material. The canopy 19 includes side sections 20 extending generally vertically between the top assembly 13 and the side walls 14 of the frame and front and rear porch sections 21 and 22 which extend outwardly from the trailer frame between the top assembly 13 and the frame front wall and rear wall, respectively. The bottom of each of the porch sections is provided by a relatively rigid plank or the like which may support a mattress within the trailer for sleeping. The bottoms of the front and rear porch sections are maintained generally horizontally by front support struts 23 and rear support struts 24, respectively. The front support struts 23 are attached to the trailer hitch 16, and the rear support struts 24 are attached to rear stabilizers 25. The rear stabilizers 25 and front stabilizers 26 extend downwardly from the trailer frame 11 and maintain the trailer in a stable position even when one or more campers are walking about within the trailer enclosure.

One of the canopy side sections 20 may be provided with a door flap or door opening, and the canopy 19 may also include the usual mesh or screen windows 19a, 19b, 19c, and 19d.

Figure 5:
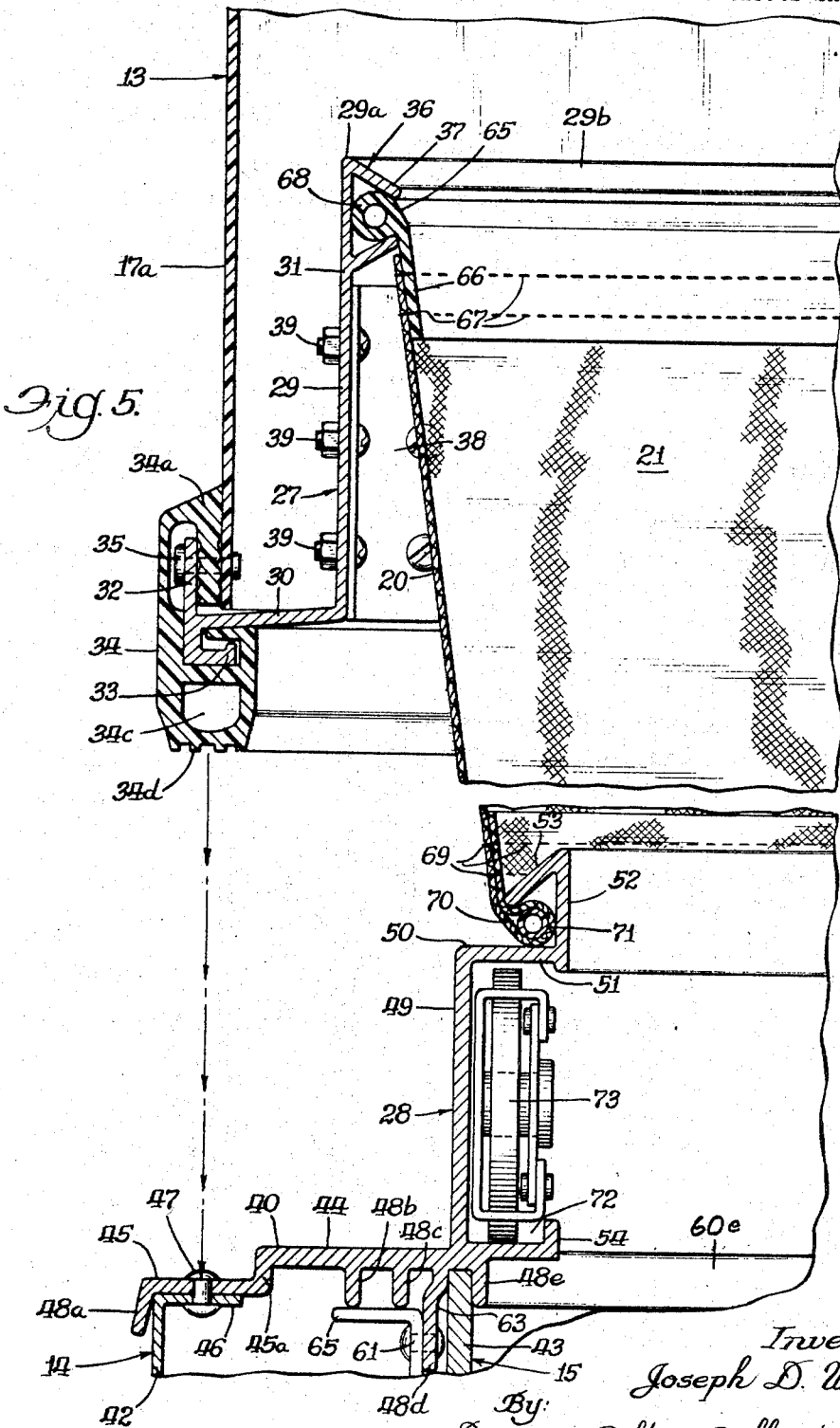
FIG. 5 is an enlarged fragmentary sectional view taken along the line 5—5 of FIG. 2.

Referring now to FIGS. 3 and 5, the top assembly 13 is seen to include an upper channel assembly 27, and the frame 11 includes a lower channel assembly 28. The upper channel assembly 27 includes a perimetrically extending upper canopy support channel 29, which is generally L-shaped in vertical cross-section and includes a generally horizontal base portion 30 and generally vertical leg portion 31. The outer end of the base portion 30 terminates in an upwardly extending attaching flange 32 and downwardly extending L-shaped foot portion 33. A resilient gasket 34 of rubber or other suitable material is secured about the upper support channel 29 by lip portions 34a and 34b which extend around the attaching flange 22 and the foot portion 33, respectively, of the channel. Both the gasket 34 and the upper channel 29 are attached to the depending side wall 17a of the cover 17 by rivets 35 which extend through the attaching flange 32, the lip portion 34a of the gasket, and the side wall 17a. The upper end of the leg portion 31 terminates in a dove tail-shaped trough 36 which is formed by converging walls 37 and which opens toward the inside of the enclosure defined by the cover 17 and the depending side walls 17a thereof.

The upper channel 29 extends perimetrically about the cover 17 and may be made up of individual elongated sections which extend along the relatively straight portions of the depending side wall 17a. For example, upper channel section 29a extends along the portion of the side wall 17a above the frame side 14, upper channel section 29b extends along the portion of the side wall 17a above the front wall of the trailer frame, and channel section 29c is attached to the side walls 17a above the rear wall 15 of the frame (FIG. 4). Adjacent channel sections are joined by angle brackets 38 (FIG. 5) and bolts 39.

The bottom channel assembly 28 includes a pair of elongated side channels 40 attached to the side walls 14 of the frame 11, and a pair of elongated end channels 41 (FIG. 4) attached to the front and rear walls, or end walls, of the frame 11. Referring to FIGS. 3 and 5, the side walls 14 are seen to be hollow, and each side wall includes spaced-apart outer and inner panels 42 and 43, respectively. The outer panel 42 may be made of aluminum or steel, while the inner panel 43, which forms the wall of the trailer enclosure, may be made of wood.

The side channels 40 include a generally vertical base portion 44 which extends between the outer and inner panels. The outer end of the base portion 44 includes a stepped portion 45 which is spaced below the remainder of the base portion by shoulder 45a and which is attached to inwardly extending flange 46 of the panel 42 by longitudinally spaced rivets 47. A plurality of longitudinally extending ribs 48a, 48b, 48c, 48d, and 48e project downwardly from the base portion 44. The ribs 48a extends downwardly adjacent the outer surface of the outer panel 42 and is advantageously somewhat inclined outwardly from the vertical and inner panel 43 is received somewhat snugly between ribs 48d and 48e.

Extending generally vertically upwardly from the base portion 44 is leg portion 49 which terminates in an elongated trough 50 formed by inwardly extending wall 51, vertically extending wall 52, and outwardly and downwardly inclined wall 53. The side channel 40 may also include an L-shaped wheel support flange portion 54 extending inwardly from the leg portion 49, which will be described more fully below.

Referring to FIG. 4, end channel 41 extends between outer panel 55 and inner panel 56 which form the hollow rear wall 15 of the trailer frame 11. The end channels 41 are shaped similarly to the base portions 44 of the side channels 40 and include a stepped portion 57 which is spaced below the remainder of the end channel by shoulder 57a and which is secured to flange 58 of the outer panel 55 by rivets 59. The end channels 41 include longitudinally extending, downwardly projecting ribs 60a, 60b, 60c, 60d, and 60e similar to the corresponding ribs of the side channels.

The side channels 40 extend along the entire length of the frame side walls 14, and the end channels 41 extend along the entire length of the front and rear frame walls. The ends of the side channels and end channels are mitered at the corners of the trailer frame, and adjacent side and end channels are reinforced and secured together by right-angle stiffeners 61. The stiffeners 61 are secured to the rib 48d and the rib 60d of adjacent side and end channels, respectively, by rivets 62. The ribs 48d and 60d are offset sligthly outwardly as at 63 and 64, respectively, to provide room between the rib and the associated inner panel for the rivet head, and these ribs extend downwardly somewhat beyond the other ribs of each channel. The ribs 48b and 48c of the side channels and the ribs 60b and 60c of the end channels reinforce the channels, and further support for the channels is provided by flange portions 65 which extends outwardly from the top of each stiffener 61 and abuts these ribs. The bottom of the stiffeners 61 are suitably secured to the lower part of the frame 11.

The uniquely shaped side and end channels rigidly connect the outer and inner panels of the walls of the frame, and the hollow walls permit the frame to be made substantially lighter without a corresponding decrease in rigidity. Each of the side channels, end channels, and upper channel sections may be made integrally from extruded aluminum.

When the trailer is in the use position illustrated in FIG. 2, the canopy 19 extends between the top assembly 13 and the frame 11. Referring to FIG. 5, the side section 20 of the canopy extends between the upper canopy support channel 29 and the side canopy support channel 40. Rubber fastener 65 extends along the upper edge of the canopy section 20, and includes a relatively flat portion 66 which is suitably secured to the canopy section 20 as by stitching 67, and a tubular portion 68 which is releasably received by the trough 36 of the channel 29. The fastener 65 is preferably made of rubber or other compressible and resilient material, and the diameter of the tubular portion 68 is slightly greater than the distance between the ends of the converging walls 37 of the trough 36 so that the fastener may be inserted into or removed from the trough by the application of a suitable force, but will not be removed from the trough merely by the weight of the downwardly hanging side section 20 of the canopy.

The lower edge of the canopy section 20 is reversely folded and secured as by stitching 69 to form a longitudinally extending loop 70. An elongated rod 71 is received by the loop 70 and may also be made of relatively compressible and resilient material. The loop 70 and the rod 71 are received by the trough 50 of the side channel 40 and the diameter of the loop formed about the rod 71 is slightly greater than the distance between the end of the inclined wall 53 and the wall 51 of the trough so that the loop may be inserted into and removed from the trough by the application of a suitable force.

When the trailer is in the use position illustrated in FIG. 5, a seal is maintained between the canopy section 20 and the top assembly 13 by the contact between the rubber fastener 65 and the trough 36, and between the canopy section and the frame by the contact between the loop 70 and the trough 50 so that bugs and water cannot get into the interior of the trailer. I have found that the channel assemblies provide a particularly effective seal for maintaining the camping trailer watertight even in severe storms. The upwardly extending leg portion 30 of the upper canopy support channels provide for an attachment between that channel and the side sections 20 of the canopy well above the lower edge of the depending side wall 17a of the trailer cover, and the depending side wall 17a will substantially prevent water from reaching the juncture between the rubber fastener 65 and the trough 36 even in severe rain storms. Water which runs down the side section 20 of the canopy toward the bottom edge thereof will reach the bottom wall 51 of the trough 50 and will drain outwardly. If water is to reach the interior of the trailer it must not only pass between the loop 70 and the trough wall 51, but it must travel upwardly around the loop 70 and the inclined trough wall 53. The resilient rod 71 maintains a rather snug fit of the loop 70 against the walls of the trough 50, thereby decreasing the likelihood of water seepage into the trough.

In the particular embodiment illustrated, the trailer 10 includes outwardly extending porch sections 21 and 22. The upper edges of each of these porch sections is connected to the perimetric upper channel 29 in the same manner as the canopy side section 20. The relatively rigid bottoms of the porch sections extend outwardly over the end channels 41, and the likelihood of rain entering the interior of the trailer from underneath the porch sections is minimal. If desired, the porch sections may be replaced with relatively vertically extending sections such as the side sections 20, and the end channels may be replaced with side channels 40.

The unique shape of the side channels 40 provide wheel guide channels 72 defined by the leg portion 49, the trough wall 51 and the L-shaped wheel-support flange 54. Wheels 73 are received by the wheel guide channel 72 and are rotatably secured to the inner ends of the bottoms of the porch sections. The porch sections may be moved into their storage positions within the side walls of the trailer frame merely by sliding the bottoms inwardly on the wheels toward the middle of the trailer side walls.

When the camping trailer is to be moved from its use position into its storage position, the porch sections 21 and 22 are first slid inwardly. The support posts 18 are then unlocked or removed to allow the top assembly 13 to move downwardly toward the frame 11. As the top assembly 13 moves downwardly, each side section 20 of the canopy buckles inwardly and may either fold itself into a plurality of folds 20' (FIG. 3) or may merely fold itself into a single fold which extends into the interior of the trailer. As the top assembly 13 approaches the frame 11, the top channel assembly 27 nests with the L-shaped side channels 40, and the gasket 34 contacts the stepped portions 45 of the side channels and the stepped portions 57 of the end channels.

The flexibility of the gasket 34 is increased by a longitudinally extending bore 34c provided therethrough, and the weight of the top assembly 13 compresses the gasket tightly against the stepped portions to provide a substantially water-tight seal between the top assembly and the frame. The flexibility of the gasket is such that the gasket will deform about the slightly protruding rivets 47 and 59 which are spaced along the stepped portions 45 and 57, respectively, and the sealing ability of the gasket may be further increased by providing a plurality of longitudinally extending ribs 34d.

Any water which may seep between the gasket 34 and the stepped portion 57 of the end channels will be restrained from reaching the interior of the trailer by the shoulder 57a. Similarly, the shoulder 46a of the stepped portion 46 retards water seepage along the side channels, and the leg portions 49 serve as a final barrier against seepage.

If desired, the canopy 19 may be disengaged from the top channel assembly 27, and the lower edges of the side sections 20 of the canopy may be disengaged from the side channels 29 before the top assembly 13 is moved downwardly to the storage position. The resilient rubber fastener 65 permits the upper edge of the canopy to be readily withdrawn from the trough 36, and the resilient rod 71 likewise permits ready removal of the bottom edge of the side wall 20 from the trough 50. When the trailer is to be reassembled for use, the fastener 65 and the rod 71 may just as easily be reinserted into troughs 37 and 50, respectively.

The fastening means for the canopy is substantially hidden, and the use of unsightly zippers, snaps, etc. which are commonly used and which are subject to rust, breaking and the like is avoided. The attachment between the canopy and the top assembly is hidden by the depending perimetric side wall of the cover, and the attaching rivets of the upper channels are hidden by the gasket. The bottom edges of the side sections of the canopy are received by the side channel troughs, and no attaching means are visible.

While in the foregoing specification, I have set forth a detailed description of a specific embodiment of my invention for the purpose of illustration, it is to be understood that many of the details herein given may be varied considerably by those skilled in the art without departing from the spirit and scope of my invention.

I claim:

1. In a camping trailer having a frame and a top assembly, said frame including a plurality of generally vertically extending frame walls, said top assembly being moveable between a raised position spaced vertically from said frame and a lowered position on said frame a canopy section having upper and lower edges and extending between said top assembly and said frame when said top assembly is in the raised position, said top assembly including (i) a cover having a depending perimetric side wall, (ii) an elongated upper canopy support channel attached to said dpending side wall, said upper channel including a longitudinally extending trough spaced inwardly of said depending side wall and opening toward the inside of said cover, said frame including an elongated side channel attached to one of said frame walls adjacent the top thereof, said side channel having a longitudinally extending trough opening toward the outside of said frame, said side channel trough releasably securing the lower edge of said canopy section and said upper channel trough releasably securing the upper edge of said canopy section when said top assembly is in the raised position.

2. The structure of claim 1 in which said upper channel is generally L-shaped in vertical cross-section and includes a generally horizontally extending base portion and a leg portion extending generally vertically upwardly from said base portion, said leg portion terminating in said upper channel trough, said base portion terminating in a flange portion attached to said depending side wall adjacent the bottom thereof.

3. The structure of claim 1 in which said one frame wall includes spaced-apart inner and outer panels, said side channel being generally L-shaped in vertical cross-section and including a generally horizontally extending base portion and a leg portion extending generally vertically upwardly from said base portion, said base portion extending between said inner and outer panels and supported thereby.

4. The structure of claim 3 in which said base portion includes a plurality of spaced-apart downwardly extending ribs, said inner panel being received between two of said ribs, said outer panel being positioned adjacent to and inwardly of another of said ribs.

5. In a camping trailer having a frame and a top assembly, said frame including a pair of generally vertically extending side walls and a pair of generally vertically extending end walls, said top assembly being movable between a raised position spaced vertically from said frame and a lowered position on said frame, a canopy side section having upper and lower edges extending between said top asembly and each of said frame side walls when said top assembly is in the raised position, said top assembly including (i) a generally flat cover having a depending perimetric side wall, (ii) an elongated generally L-shaped upper canopy support channel attached to said depending perimetric side wall above each of said frame side walls, each of said upper channels including (A) a generally horizontally extending base portion and (B) a leg portion extending generally vertically upwardly from said base portion, each leg portion terminating in a longitudinally extending trough spaced inwardly of said depending side wall and opening toward the inside of said cover, each base portion terminating in a flange portion attached to said depending side wall adjacent the bottom thereof, an elongated side channel on each of said frame side walls, each of said side channels being generally L-shaped in vertical cross-section and including (i) a generally horizontally extending base portion secured to the frame side wall and (ii) a leg portion extending generally vertically upwardly from said side channel base portion and terminating in a longitudinally extending trough opening toward the outside of said frame, each of said side channel troughs releasably securing the lower edge of one of said canopy side sections and each of said upper channel troughs releasably securing the upper edge of one of said canopy side sections when said top assembly is in the raised position.

6. The structure of claim 5 including an elongated gasket secured to each of said upper channel flange portions, the base portion of each of said side channels terminating in a stepped portion spaced below the remainder of the base portion, said gaskets and said stepped portions being generally vertically aligned, said gasket sealingly engaging said stepped portions when said top assembly is in the lowered position.

7. The structure of claim 5 including upper support channels attached to said depending perimetric side wall above each of said end walls, a gasket extending perimetrically about said cover and attached to said upper channels, the base portion of each of said side channels terminating in a stepped portion spaced below the remainder of the base portion, a generally horizontally extending end channel on each of said frame end walls, each of said end channels including a stepped portion spaced below the remainder of the end channel, said gasket and said stepped portions being generally vertically aligned, siad gasket sealingly engaging said stepped portions when said top assembly is in the lowered position, whereby a perimetric seal is maintained between the top assembly and the frame.

8. The structure of claim 7 in which said frame side walls and said frame end walls include spaced apart inner and outer panels, each of said side channel base portions including a plurality of spaced-apart downwardly extending ribs, the inner panel of each frame side wall being received between two of said side channel portion ribs, the outer panel of each frame side wall being positioned adjacent to and inwardly of another of the side channel ribs, each of said end channels including a plurality of spaced-apart downwardly extending ribs, the inner panel of each frame end wall being received between two of said end channel ribs, the outer panel of each frame end wall being positioned adjacent to and inwardly of another of said end channel ribs.

9. The structure of claim 5 in which said upper channels and said side channels are extruded aluminum.

10. The structure of claim 5 in which said side channels include an elongated wheel support flange extending inwardly from said leg portion, whereby said side channels are adapted to support and guide a wheel.

References Cited

UNITED STATES PATENTS 3,053,562   9/1962   Farber _____ 296—26
3,288,520   11/1966  Krutzikowsky.

PHILIP GOODMAN, Primary Examiner

U.S. Cl. X.R.

135—1